(12) United States Patent
Brindle

(10) Patent No.: US 7,802,815 B2
(45) Date of Patent: Sep. 28, 2010

(54) WORKING MACHINE

(75) Inventor: Richard James Brindle, Burton on Trent (GB)

(73) Assignee: JCB Compact Products Limited, Rocester, Uttoxeter (GB)

( * ) Notice: Subject to any disclaimer, the term of this patent is extended or adjusted under 35 U.S.C. 154(b) by 0 days.

(21) Appl. No.: 12/500,720

(22) Filed: Jul. 10, 2009

(65) Prior Publication Data
US 2009/0273171 A1 Nov. 5, 2009

Related U.S. Application Data

(62) Division of application No. 11/623,116, filed on Jan. 15, 2007, now abandoned.

(30) Foreign Application Priority Data
Jan. 20, 2006 (GB) ................ 0601149.8

(51) Int. Cl.
*B62D 21/18* (2006.01)
(52) U.S. Cl. ................... 280/781; 180/9.23
(58) Field of Classification Search ........... 180/9.23, 180/623, 327, 6.7; 280/781; 37/347
See application file for complete search history.

(56) References Cited

U.S. PATENT DOCUMENTS

| 1,379,710 | A | | 5/1921 | Matteson | |
|---|---|---|---|---|---|
| 1,439,236 | A | | 12/1922 | Harris | |
| 1,773,252 | A | | 8/1930 | Bager | |
| 1,836,446 | A | | 12/1931 | Christie | |
| 1,875,052 | A | | 8/1932 | Ljungkull | |
| 2,144,760 | A | | 1/1939 | Harnischfeger | |
| 2,813,760 | A | | 11/1957 | Spanjer | |
| 3,007,740 | A | | 11/1961 | Ronning | |
| 3,037,571 | A | | 6/1962 | Zelle | |
| 3,398,806 | A | | 8/1968 | Hendricks | |
| 3,477,769 | A | | 11/1969 | Thompson | |
| 3,529,687 | A | | 9/1970 | Pensa | |
| 3,824,578 | A | | 7/1974 | Harders | |
| 3,872,939 | A | * | 3/1975 | Eckert | 180/6.48 |
| 3,938,605 | A | | 2/1976 | Koch | |
| 3,972,378 | A | * | 8/1976 | Houriez et al. | 180/6.58 |
| 4,010,400 | A | * | 3/1977 | Hollister | 315/248 |
| 4,231,699 | A | | 11/1980 | Thompson | |
| 5,293,949 | A | * | 3/1994 | Zimmermann | 180/9.48 |

(Continued)

FOREIGN PATENT DOCUMENTS

EP 1426497 A1 6/2004

(Continued)

*Primary Examiner*—Tony H. Winner
(74) *Attorney, Agent, or Firm*—MacMillan, Sobanski & Todd, LLC

(57) ABSTRACT

A working machine has a main frame structure which includes a pair of endless tracks; each track is entrained about track supporting devices mounted by a track sub-frame. The sub-frame includes inner and outer members interconnected by cross members. The inner and outer members are arranged side by side and mounting at or adjacent upper edges thereof, at least one upper track support device between the members. The inner and outer members mount at or adjacent lower edges thereof, at least one lower track supporting device between the members. The inner and outer members and cross members of at least one of the track sub-frames is a monolithic casting.

10 Claims, 2 Drawing Sheets

U.S. PATENT DOCUMENTS

| | | | |
|---|---|---|---|
| 5,598,896 A * | 2/1997 | Haest | 180/9.48 |
| 5,823,279 A * | 10/1998 | Petzold | 180/9.1 |
| 6,848,522 B2 * | 2/2005 | Moore et al. | 180/9.1 |
| 7,007,764 B2 * | 3/2006 | Smith et al. | 180/9.1 |
| 7,104,306 B2 | 9/2006 | Huggins et al. | |
| 7,204,519 B2 * | 4/2007 | Kubo et al. | 280/781 |
| 7,216,926 B2 | 5/2007 | Hampel | |
| 7,229,140 B2 | 6/2007 | Page et al. | |
| 7,293,374 B2 * | 11/2007 | Fukushima | 37/397 |
| 7,293,375 B2 | 11/2007 | Fukushima et al. | |
| 7,338,801 B2 * | 3/2008 | Goryshin et al. | 435/473 |
| 2006/0080930 A1 | 4/2006 | Brindle | |
| 2007/0148004 A1 | 6/2007 | Wernicke et al. | |
| 2007/0169967 A1 | 7/2007 | Brindle | |

FOREIGN PATENT DOCUMENTS

| | | |
|---|---|---|
| EP | 1479831 A3 | 11/2004 |
| EP | 1479833 A2 | 11/2004 |
| EP | 1564113 A1 | 8/2005 |
| EP | 1811090 A2 | 7/2007 |
| WO | 03036085 A1 | 5/2003 |

* cited by examiner

US 7,802,815 B2

WORKING MACHINE

CROSS-REFERENCE TO RELATED APPLICATIONS

Priority is claimed to United Kingdom patent application Serial No. 0601149.8 filed Jan. 20, 2006. This is a division of U.S. patent application Ser. No. 11/623,116 filed Jan. 5, 2007.

STATEMENT REGARDING FEDERALLY SPONSORED RESEARCH OR DEVELOPMENT

Not Applicable.

TECHNICAL FIELD

This invention relates to a working machine of the kind including a frame with a ground engaging lower structure including a pair of endless tracks each entrained about track supporting devices mounted by a track sub-frame.

BACKGROUND OF THE INVENTION

Conventionally track sub-frames are fabricated structures which may mount a track motor which drives a track-driving sprocket. By virtue of the track sub-frames being fabricated they are expensive to produce, requiring the assembly of many different components. Typically such track sub-frames are attached by fasteners for example to the remainder of the ground engaging lower structure.

BRIEF SUMMARY OF THE INVENTION

According to a first aspect of the invention, a working machine is provided having a main frame structure which includes a pair of endless tracks, each track being entrained about track supporting devices mounted by a track sub-frame. The sub-frame includes inner and outer members interconnected by cross members. The inner and outer members are arranged side by side and mounting at or adjacent upper edges thereof, at least one upper track support device between the members. At or adjacent lower edges of the inner and outer members, at least one lower track supporting device extends between the members. The inner and outer members and cross members of at least one of the track sub-frames is provided by a monolithic casting of a weldable casting material such as steel. The track sub-frame or frames may be attached to the remainder of the main frame structure by welding, for optimum strength.

According to a second aspect of the invention, a method is provided of making a working machine having a main frame structure which includes a pair of endless tracks. Each track is entrained about track supporting devices mounted by a respective track sub-frame. The method includes making at least one of the track sub-frames by providing a monolithic casting including inner and outer track sub-frame members arranged side by side with there being integral cross members interconnecting the track sub-frame members.

DETAILED DESCRIPTION OF THE INVENTION

Figure 1:
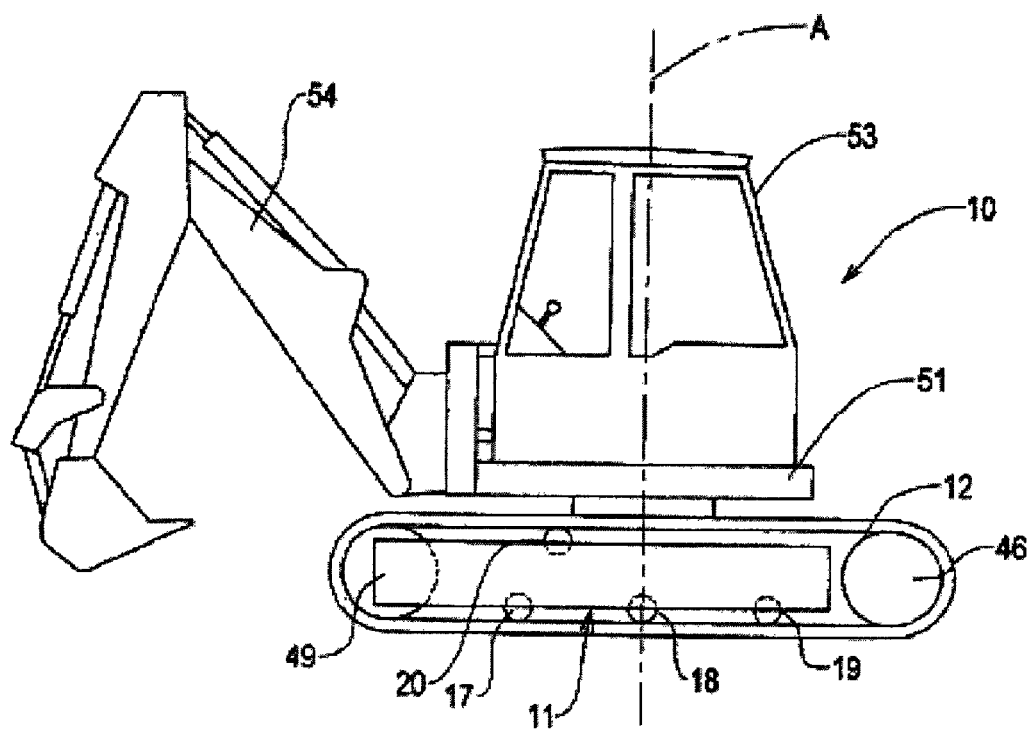
FIG. 1 is an illustrative side view of a working machine which may embody the invention.

Referring to the drawings, a working machine 10 includes a main frame structure 11 which includes a pair of tracks 12, one at each side of the machine 10. Each track 12 is entrained about track support devices which are mounted by respective track sub-frames 15, 16. The track support devices in this example, include three lower rollers 17, 18, 19, the track 12 passing between the lower rollers 17, 18, 19 and the ground, and at least one upper roller 20. The track sub-frames 15, 16 each also include a mounting 47 for a track tensioning device which includes a track tensioning element 49 which is resiliently biased so as to maintain a tension in the track 12.

Each sub-frame 15, 16 has inner 24 and outer 25 members arranged substantially side by side, and cross members 26 between them, the cross members 26 interconnecting and maintaining a spacing between the track sub-frame members 24, 25. The track sub-frame members 24, 25 and the cross members 26 are each provided for each track sub-frame 15, 16 as a monolithic casting. Integrally cast in lower edges 27 of each respective track sub-frame member 24, 25 are a plurality of recesses 30-34. The recesses 30, 31, 32 each mount a spindle of a respective lower track support device roller 17, 18, 19 whilst recesses 33, 34 are each provided to lighten the casting. Integrally cast in upper edges 28, 29 of each of track sub-frame member 24, 25 is a mount 35 for the upper track support device, roller 20, and a further recess 36 to lighten the casting.

The pair of track sub-frames 15, 16 are arranged side by side with a main frame part 40 of the main frame structure 11 between them. The inner track sub-frame members 24 of each of the pair of track sub-frames 15, 16, each are provided with integrally cast inwardly extending formations 42, arranged in pairs. These inwardly projecting formations 42 are provided for attaching the cast track sub-frames 15, 16 to the main frame part 40 as hereinafter described.

Figure 2:
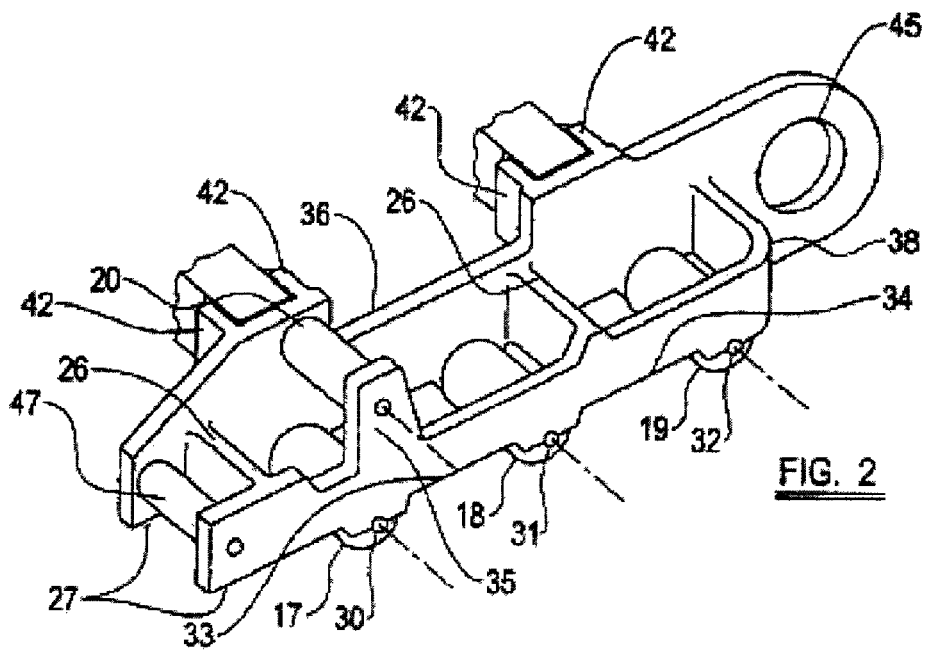
FIG. 2 is an illustrative perspective view of a track sub-frame of the main frame structure of the machine of FIG. 1, but with the track removed for clarity.
Figure 3:
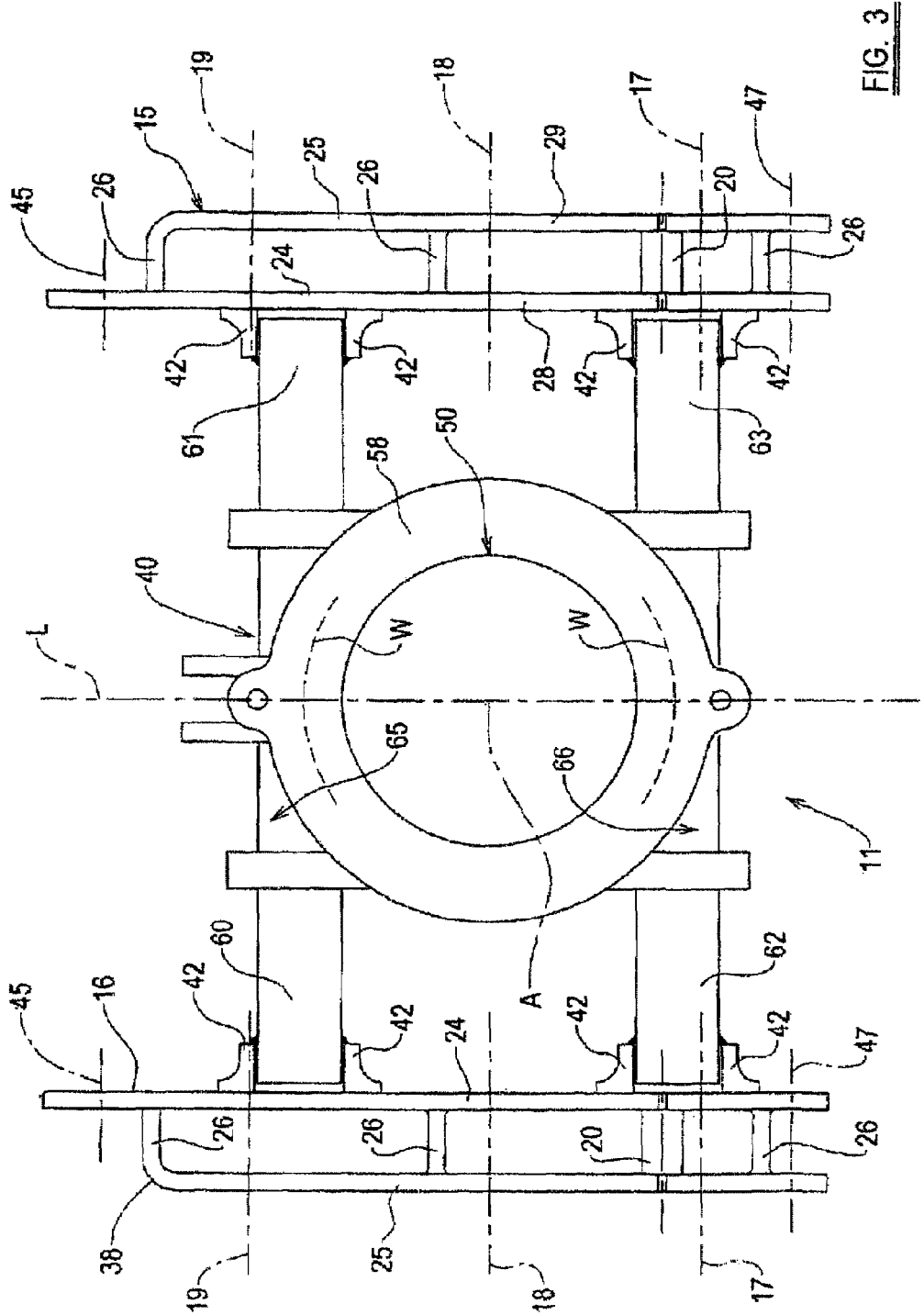
FIG. 3 is an illustrative plan view of the main frame structure of the machine of FIG. 1, again with drive tracks removed.

In FIG. 2, it can be seen that the inner track sub-frame member 24 of each of the pair of track sub-frames 15, 16 extends longitudinally rearwardly of the machine 10, beyond an edge 38 of the outer track sub-frame member 25, and the extended track sub-frame member 24 part, is provided with an opening 45. This opening 45 is for mounting a track motor (not shown) which drives a track drive sprocket 46 (see FIG. 1) to impart drive to the track 12 and hence to the machine 10 over the ground. The track motors conventionally are driven by hydraulic fluid provided by a pump of the machine 10.

At least one of the track sub-frame members 24, 25, both in this example, provide between them the mounting 47 for the track tensioning mechanism which includes the resiliently biased track tensioning element (roller) 49 which is biased in a direction to maintain a desired tension in the track 12.

The main frame part 40 includes a central portion 50 which supports a slewing mechanism, for slewing an upper frame structure 51 relative to the main frame structure 11. The upper frame structure 51 includes a cab 53 for a machine operator, carries a working arm 54, houses an engine and cooling pack (not seen) and mounts the hydraulic pump. The upper frame structure 51 may be slewed by the slewing mechanism relative to the main frame structure 11 about a generally upright axis A. In this example, the central portion 50 of the main frame part 40 supports a slew ring around a generally circular opening 58 which receives a depending part of the upper frame structure 51 to guide the upper frame structure 51 during slewing.

The main frame part 40 further includes four connecting arms 60-63 for attaching the central portion 50 to the track sub-frames 15, 16. A first pair of the connecting arms 60, 61 are provided by either end of a fabricated box section element 65, whilst a second pair of the connecting arms 62, 63 are provided by either end of another fabricated box section element 66. The connecting arms 60-63 are each attached to respective track sub-frames 15, 16 by welding to the integral cast inwardly extending projecting formations 42. Although in this example, each connecting arm 60-63 is welded between a pair of such formations 42, in another example the arms 60-63 may each be welded to a single inwardly extending formation 42, or to more than one or two formations one or more of which may extend within the fabricated box section element 65, 66. The box section elements 65, 66 are each welded to the central portion 50 as indicated at W, and extend substantially perpendicularly relative to a longitudinal axis L of the working machine 10.

It will be appreciated that particularly where the monolithic castings of the track sub-frames 15, 16 are provided in an readily weldable cast material, such as cast steel, welding of the fabricated box section elements 65, 66 to the track sub frame castings is facilitated. However the track sub frames 15, 16 may be cast in any weldable material, such as cast iron although special equipment and techniques may be required to weld the castings 15, 16 to the elements 65, 66. Moreover the central portion 50 of the main frame structure 40 preferably is cast in steel to facilitate welding the fabricated box section elements 65, 66 to the central portion 50, but again may be provided in another preferably weldable material.

During manufacture it will be appreciated that by attaching the castings of the track sub-frames 15, 16 to the main frame part 40 as described, a very strong main frame structure 11 may be provided.

Many modifications may be made without departing from the scope of the invention. For example, the track sub-frame members 24 and 25 of each track sub-frame 15, 16 need not be of the exact configurations shown and described, and more or less track supporting devices than those shown at 17, 18. 19 and 20 may be provided as are required to support the track 12. Although it is preferable for the main frame part 40 to include a cast central portion 50 and for there to be four connecting arms 60 to 63 provided by fabricated box section elements 65, 66 other main frame part 40 configurations are possible.

In FIG. 1, the machine shown to which it has been described the present invention may be applied, is conventionally known as a "mini" or "micro" excavator, because the working machine 10 is small and the working arm 54 thereof is configured to perform excavating operations. The invention may be embodied in a larger working machine which may or may not have a slewing mechanism for slewing an upper frame structure 51 relative to the main frame structure 11. Indeed the invention is applicable to any working machine having a pair of tracks 12.

The invention claimed is:

1. A working machine including a main frame structure, an upper frame structure, the upper frame structure being slewable relative to the main frame structure about a substantially upright axis, the main frame structure including a main frame part provided by a cast central portion and four connecting arms which extend outwardly of the central portion towards two monolithic cast track sub-frames at the sides of the machine, wherein the central portion of the main frame part is a casting, and the four connecting arms are ends of two fabricated elements which are attached to the central portion, wherein each track sub-frame includes inner and outer track sub-frame members arranged generally side by side with cross members between and spacing the inner and outer track sub-frame members of each track sub-frame apart, wherein the inner and outer sub-frame members and the cross members of each track sub-frame are of a weldable material, wherein the inner track sub-frame members each include a plurality of integrally provided formations which extend inwardly towards the central portion of the main frame part, and wherein the fabricated elements of the main frame part are welded to the inwardly extending formations to attach the central portion to the track sub-frames.

2. A machine according to claim 1 wherein the fabricated elements are box sections.

3. A machine according to claim 2 wherein the fabricated elements extend substantially perpendicularly to a longitudinal axis of the working machine, between the track sub-frames.

4. A machine according to claim 1 wherein the cast central portion is cast in a weldable material and the fabricated elements are welded to the central portion.

5. A machine according to claim 1 wherein the track sub-frames are made of a weldable material and the connecting arms are welded to the track sub-frames.

6. A machine according to claim 1 wherein the cast central portion includes a generally central opening to receive a depending part of the upper frame structure, the central axis of the opening defining the slewing axis about which the upper frame structure may be slewed.

7. A method of manufacturing a frame for a working machine comprising the steps of providing a main frame structure and an upper frame structure which is slewable relative to the main frame structure about a substantially upright axis; providing the main frame part comprising a cast central portion; and a pair of fabricated elements attached to the cast central portion with the ends of the fabricated portions provide four connecting arms; and securing the connecting arms to two track sub-frames of the main frame structure which will be positioned at opposite sides of the machine.

8. A method according to claim 7 and wherein each of the track sub-frames is cast from a weldable material, and wherein two connecting arms are secured to projecting formations on each track sub-frame by welding.

9. A method of manufacturing a working machine which includes a main frame structure and an upper frame structure, and in which the upper frame structure is slewable about a substantially upright axis relative to the main frame structure, the method including the steps of providing the main frame structure by casting a central portion of a main frame part, attaching to the central portion a pair of fabricated elements the ends of which provide connecting arms to provide the main frame part; providing two monolithic cast track sub-frames each including an inner track sub-frame member including a plurality of integrally provided projecting formations; positioning the two track sub-frames parallel to each other on opposite sides of the main frame central portion with the formations extending towards the central portion of the main frame part; and securing two of the connecting arms to projecting formations on each track sub-frame.

10. A method according to claim 9 and wherein the central portion is cast from a weldable material, and wherein the fabricated elements are welded to the central portion.

* * * * *